INVENTORS
LOUIS J. FRANCHI
RALPH SELLITE
JAMES E. BULLOCH
BY Constantine A. Michalos
ATTORNEY April 23, 1968 L. J. FRANCHI ET AL 3,379,951
FAIL OPERABLE SERVOMECHANISM FOR AN AUTOMATIC
FLIGHT CONTROL SYSTEM
Filed Nov. 30, 1964 2 Sheets-Sheet 2

INVENTORS
LOUIS J. FRANCHI
RALPH SELLITE
JAMES E. BULLOCH
BY Constantine R. Michalos
ATTORNEY 3,379,951
FAIL OPERABLE SERVOMECHANISM FOR AN AUTOMATIC FLIGHT CONTROL SYSTEM
Louis J. Franchi, Cresskill, Ralph Sellite, Montvale, and James E. Bulloch, Lake Hiawatha, N.J., assignors to Bendix Corporation, Teterboro, N.J., a corporation of Delaware
Filed Nov. 30, 1964, Ser. No. 414,564
10 Claims. (Cl. 318—489)

ABSTRACT OF THE DISCLOSURE

A fail operative apparatus for an automatic flight control system including a plurality of redundant servomechanisms operatively coupled to the flight control system, together with comparison means operable by the servomechanisms, and means operable by the comparison means for disconnecting one of the servomechanisms from the control system upon a failure to operate while other of said servomechanisms remain operatively coupled to the flight control system.

---

Figure 1:
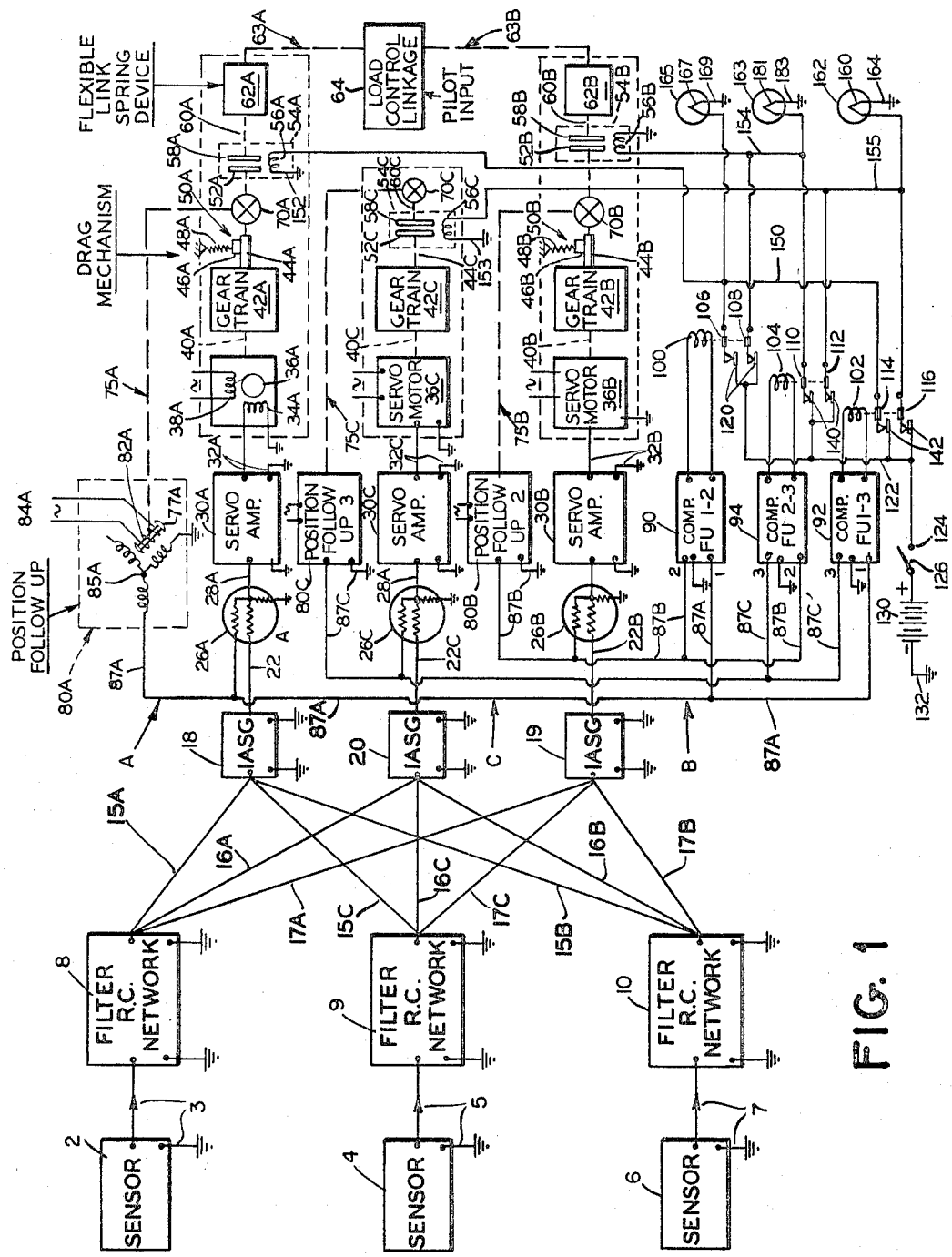

This invention relates to improvements in a fail operable servomechanism for an automatic flight control system and, more particularly, to novel means for minimizing or limiting an extraneous input to the system so as to permit ready failure detection.

Heretofore, there has been provided a fail operative mechanism for a series rudder power control for an automatic flight control system in which there was provided a dual system including a servomechanism clutched to a control load with a second servo off-line mechanism arranged for monitoring the first servomechanism. The monitoring in such system has been heretofore accomplished by comparing an output signal from a follow-up device operable by each of the servomechanisms. It was considered theoretically that, since both servomechanisms were identical, the sum of the follow-up signals would be zero except in the event of malfunction of one of the servomechanisms or the other.

In the practical operation of such a system, it was found that there were tracking differences between the respective servomechanisms by virtue of tolerance buildups and analytical studies indicated that the comparative threshold for alarm could be set so as to allow discrete sensor signal differential. The threshold would provide adequate protection against nuisance disconnect due to tolerance buildups.

However, during development testing of the system on the simulator, it was determined that the pilot's input to the control system adversely affected the monitoring. That is to say, the control valve of the mechanism was rate limited so that, under rapid pilot input conditions, the control valve would momentarily act as a fixed point and the pilot input would load up the "on-line" input servo. This loading resulted in a "follow-up" discrepancy sufficient for a nuisance alarm. A solution to this problem is to introduce a pilot's input into both servos simultaneously, by operating both systems "on-line" (clutching both servos to the load). In such a system, however, both servos would be rigidly tied together so that the "follow-ups" would never disagree except for backlash. Displacement monitoring, therefore, would be impossible.

To surmount this problem, a preloaded override spring device was introduced between the output shaft of each servo and the load. While such a system was developed so as to satisfactorily cope with the pilot input problem insofar as nuisance alarms were concerned, it was found that, in the event that the pilot disengaged the inoperative system, the remaining system would not perform well because the preloaded spring would act as a flexible coupling which introduced lost motion into the system so that such type system was found to be unsatisfactory for a fail operative system.

Therefore, an object of the invention is to provide a fail operative system in which it may be readily determined which system has failed and, to accomplish this, it has been found that a minimum of three comparisons are necessary and, therefore, system triplication is required.

Another object of this invention is to provide servosystem triplication in which the third servosystem serves as a model for the operation of the other two servosystems.

Another object of this invention is to solve the problem presented by servosystem triplication in the introduction of the pilot's input to the model eliminating thereby its effect on the line servos in which was achieved by modifying the flexible link concept so that no lost motion is introduced into the system when only one of the servosystems is operable.

Another object of this invention is to provide, in addition to the increased preload, a drag mechanism between a servo motor and servo clutch so as to effect the required attenuation of the pilot's input and assure passive failure detection.

Another object of this invention is to provide such a drag mechanism applying a drag load sufficient to exceed the preload of the operating servospring so as to generate the follow-up error for effecting an alarm.

Another object of this invention is to arrange the drag mechanism so as to apply the dragging force to a shaft between the servomotor and the clutch in each of the servosystems so that, upon an alarm and disengagement of a malfunctioning servo-system, the drag load applied to such servosystem is likewise effectively removed from the system.

Another object of this invention is to provide a preloaded spring mechanism and/or drag mechanism to attenuate an unwanted input to a failure detection device.

Another object of this invention is to provide a drag mechanism to allow for failure detection when two servomechanisms are coupled to a common load.

Another object of this invention is to provide in a fail operable servomechanism system a selective gate to minimize and/or eliminate instability when two servomechanisms are coupled to a common load.

Another object of this invention is to provide a spring coupling device to minimize and/or eliminate instability when two servomechanisms are coupled to a common load.

Another object of this invention is to provide a fail operable servosystem in which two servosystems are coupled to a common load in an arrangement such as to reduce the break-out threshold of the control system.

Another object of this invention is to provide in a fail operable servomechanism the unique arrangement of a drag device between the servo shaft and clutch so that an unwanted load may be removed when the clutch disconnects the shaft from a main load.

Another object of this invention is to provide a unique arrangement of springs and links such that the monitoring and redundancy advantages of the triplicated electronic system are available when used with a servocontrol system which is only duplicated.

These and other objects and features of the invention are pointed out in the following description in terms of the embodiment thereof which is shown in the accompanying drawings. It is to be understood, however, that the drawings are for the purpose of illustration only and are not a definition of the limits of the invention. Reference is to be had to the appended claims for this purpose.

Figure 2:
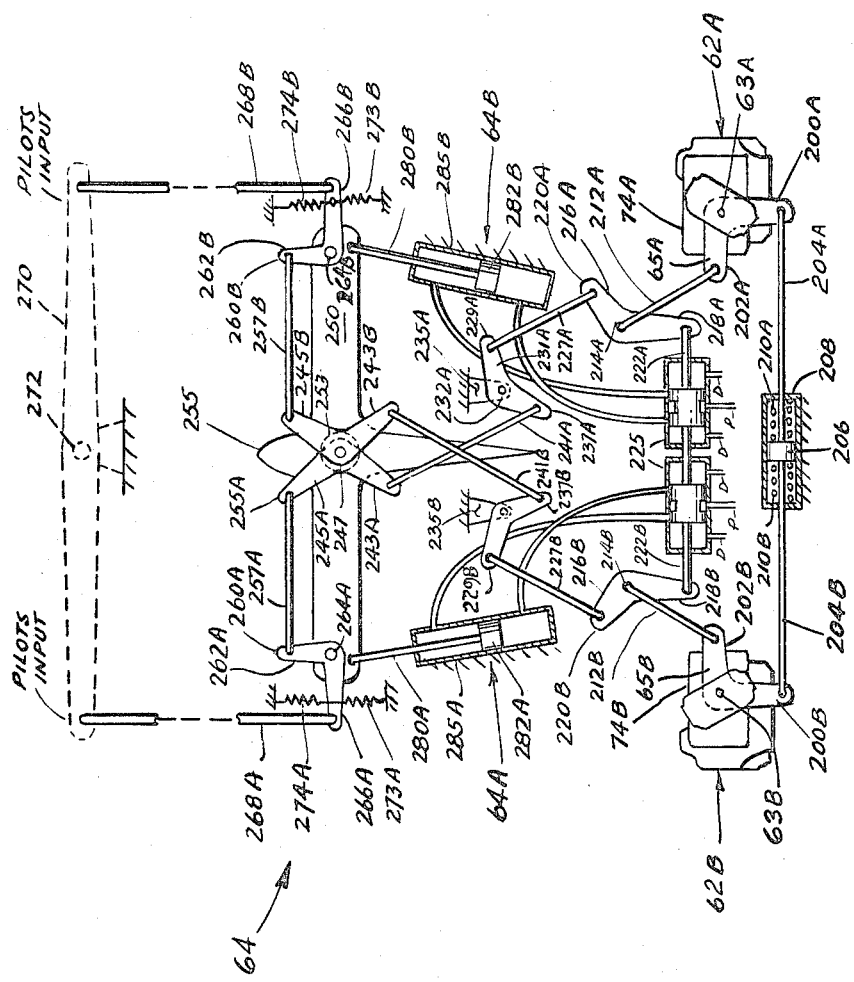

In the drawings:

FIGURE 1 is a schematic block diagram of a fail operable control servomechanism system embodying the present invention; and FIGURE 2 is a schematic diagram showing the load control linkage and the servo tie-in to the control system of FIGURE 1.

Electrical control system

In reference to the drawing of FIGURE 1, there is indicated a triplicated servosystem in which the corresponding elements of each servomechanism system have been indicated by like numerals to which there have been applied the suffix A, B, and C to distinguish between the respective elements of the first and second operating servomechanism system A and B and the third model servosystem C.

In the triplicated servosystem, there are provided three sensors such as rate gyroscopes 2, 4 and 6 of conventional type connected to output line conductors 3, 5 and 7 to filters such as in resistance and capacitor networks 8, 9 and 10 of conventional type having outputs thereof operatively connected through line conductors 15A, 16A, and 17A to the input of intermediate amplitude selective gates 18, 19, and 20, each of which may be of a conventional type or of a device such as disclosed and claimed in a copending U.S. application Ser. No. 314,397, filed Oct. 7, 1963, by Harold Moreines, now U.S. Patent No. 3,305,-735, granted Feb. 21, 1967, and in a copending U.S. application Ser. No. 317,970, filed Oct. 22, 1963, by Harold Moreines, both of which applications have been assigned to The Bendix Corporation, the assignee of the present invention.

The intermediate amplitude selective gates 18, 19, and 20 are connected to the servomechanism systems A, B, and C, respectively. The intermediate amplitude selective gate 18 has an output line conductor 22A connected through a summing network or summation resistors 26A to an input conductor 28A of a servoamplifier 30A which may be of a conventional type.

The servoamplifier 30A has output lines 32A connected to a control winding 34A of a two-phase servomotor 36A having a shaft phase winding 38A connected across a suitable source of alternating current. The servomotor 36A drives through an output shaft 40A a gear train 42A having an output shaft 44A frictionally engaged by a shoe 46A biased into contact in relation therewith by a spring 48A of a drag mechanism 50A so as to provide a predetermined preload applied to the shaft 44A for a purpose which will be explained hereinafter. The shaft 44A is drivingly connected to a clutch plate 52A of a magnetic clutch mechanism 54A. The magnetic clutch mechanism 54A has an electromagnetic winding 56A arranged upon energization to bias the clutch plate 52A into clutch engagement with a second clutch plate 58A to drivingly connect it to an output shaft 60A. The clutch mechanism 54A is so arranged that, upon deenergization of the magnetic winding 56A, the clutch plates 52A and 58A are biased out of clutch engaging relation by suitable spring means (not shown).

The output shaft 60A from the clutch mechanism 54A is drivingly connected to a flexible link preloaded override spring device 62A which may be of a type such as disclosed and claimed in a copending U.S. application Ser. No. 414,086, filed Nov. 27, 1964, by Oscar R. Wermlinger, now U.S. Patent No. 3,282,069, granted Nov. 1, 1966, and which application has been assigned to The Bendix Corporation, the same assignee as the present invention.

The flexible link preloaded override spring device 62A is operatively connected through an output shaft 63A to a bell-crank lever 65A, as shown in FIGURE 2. The servomotor 36A, gear train 42A, drag mechanism 50A, clutch mechanism 54A and flexible link preloaded override spring device 62A are operatively connected to a drive load control linkage, indicated generally by the numeral 64 and shown in block diagram in FIGURE 1 and in detail in FIGURE 2.

Further, as shown in FIGURE 1, there is drivingly connected to the gear train output shaft 44A at 70A a follow-up shaft 75A which is drivingly connected to a rotor element 77A of a position follow-up or synchro 80A. Carried by the rotor element 77A is a winding 82A electrically connected by conductors 84A across a suitable source of alternating current. The rotor winding 82A is positioned by the rotor element 77A and follow-up shaft 75A in variable inductive relation with stator windings 85A of the synchro 80A. The windings 85A are connected by output conductors 87A to the resistors or summing network 26A and thereby provide a position follow-up signal to the input conductor 28A of the servoamplifier 30A. The output conductors 87A and the synchro 80A are further connected to the inputs of comparators or difference amplifiers 90 and 92 which may be of conventional type or of a type such as illustrated by the difference amplifier of the aforenoted copending U.S. application Ser. No. 317,970.

The corresponding position follow-up or synchro 80B of the servomechanism system B has corresponding output conductors 87B which are also connected to the input of the difference amplifier or comparator 90 and a third difference amplifier or third comparator 94. Also, corresponding position follow-up synchro 80C of the model servosystem C has output conductors 87C leading to the input of the third difference amplifier 94 and the input of the difference amplifier 92.

It can be seen that the servomechanism systems A and B, connected to the input of the intermediate amplitude selective gates 18 and 19, respectively, are identical; and, therefore, the servomechanism system B need not be described, since the corresponding elements of servomechanism system B are indicated by like numerals of servomechanism system A to which there is applied the suffix B.

The third servomechanism system C is substantially identical to the other two servomechanism systems A and B except in the section following its gear train 42C. Since the servomechanism system C is primarily used for monitoring the other two servomechanism systems A and B, it is not provided with a drag mechanism, a flexible link preloaded override spring device and a drive load control linkage. As shown, the servomechanism system C is provided with a magnetic clutch mechanism 54C having a clutch plate 52C connected to a gear train shaft 44C. The magnetic clutch mechanism 54C has an electromagnetic winding 56C connected, as hereinafter more fully described.

Further, as shown in FIGURE 1, there is drivingly connected to the clutch plate 58C at 70C a follow-up shaft 75C which is drivingly connected to a position follow-up or synchro 80C in the same manner as described in the follow-up or synchro 80A for the servomechanism system A. The position follow-up or synchro 80C is then connected by output conductors 87C to the inputs of the difference amplifiers 92 and 94, as hereinbefore mentioned.

The comparators 90, 92, and 94 are so arranged that, in the event there is a predetermined difference between the respective signals applied to the inputs thereof, energization is selectively effective of the relay windings 100, 102, and 104 connected, respectively, across the outputs of the comparators 90, 92, and 94. As shown in FIGURE 1, the relay winding 100 controls switch elements or arms 106 and 108, while the relay winding 104 controls switch elements or arms 110 and 112 and relay winding 102 controls switch elements or arms 114 and 116.

The switch arms 106 and 108 are arranged to normally close, upon deenergization of the relay winding 100, a pair of switch contacts 120 connected through a conductor 122 to a switch terminal 124 which is, in turn, controlled by switch arm 126 connected to the positive terminal of a source of direct current or battery 130 which has its opposite terminal connected to ground through a conductor 132. Also connected to the conductor 122 are switch contacts 140 normally closed by the switch arms 110 and 112 upon deenergization of the relay winding 104, and also connected to the conductor 122 are switch contacts 142 which are normally closed by the switch arms 114 and 116 upon deenergization of the relay winding 102.

The switch arms 106 and 114 are connected to a conductor 150 leading to one end of the electromagnetic winding 56A of the clutch mechanism 54A, while the opposite end of the electromagnetic winding 56A is connected to ground by a conductor 152. The switch arms 108 and 110 are connected to a conductor 154 leading to one end of the electromagnetic winding 56B controlling the clutch mechanism 54B. The switch arms 112 and 116 are connected to a conductor 155 leading to one end of the electromagnetic winding 56C of the clutch mechanism 54C, while the opposite end of the electromagnetic winding 56C is connected to ground by a conductor 153.

It should be also noted that there are provided three indicator lamps 162, 163, and 165. The switch arms 106 and 114 are connected to one terminal of the filament 167 of the indicator lamp 165, while the opposite terminal of the filament 165 is connected to ground by a conductor 169. The switch arms 108 and 110 are connected to one terminal of a filament 181 of the indicator lamp 163, while the opposite terminal of the filament 181 is connected to ground by a conductor 183. The switch arms 112 and 116 are connected to one terminal of the filament 160 of an indicator lamp 162, while the opposite terminal of the filament 160 is connected to ground by a conductor 164.

In the aforenoted arrangement, it was seen that so long as there is no difference from the position follow-up signals applied to the outputs of the synchros 80A, 80B, and 80C, the relay windings 100, 102, and 104 remain deenergized and, upon closure by the operator of the switch arm 126, the respective clutch mechanism 54A, 54B, and 54C will be actuated into clutch driving relationship by the energization of the control magnetic windings 56A, 56B, and 56C and, furthermore, the circuits connecting the indicator lamps 162, 163, and 165 will be energized so as to cause illumination thereof and indicate to the operator that the servomechanism systems are operating without fault.

However, upon the output position follow-up signal applied by the synchro 80A to the input of the comparators 90 and 92 being different from that applied by the position follow-up synchro 80B and the model position follow-up synchro 80C, the relay windings 100 and 102 are controlled, respectively, by the comparators 90 and 92 to cause the relay switches 106 and 114 to bias upwardly out of contact closing relation with the switch contacts 120 and 142, respectively, so as to, in effect, open the energizing circuit for the clutch control electromagnetic winding 56A through the line conductor 150. Whereupon the clutch plates 52A and 58A will extend into an outward drive relationship to disconnect the servomechanism system A from the load control linkage 64, shown in FIGURE 2, upon one of the control linkages being in fault as failing to conform to the output in the other two servomechanism systems B and C.

Similarly, upon the output signal from the position follow-up synchro 80B applied to the input of the comparators 90 and 94 being different from the output signal applied by the position follow-up synchros 80A and 80C, the relay windings 100 and 104 will actuate the switch arms 108 and 110 out of contact, closing relation with the switch contacts 120 and 140 so as to, in effect, open the energizing circuit to the line 154 leading to the electromagnetic winding 56B controlling the clutch mechanism 54B so as to effectively disconnect the servomechanism B from the load control linkage 64 of FIGURE 2, upon the servomechanism system B failing to conform to the follow-up servo signals applied by the servomechanism system A and the model servomechanism system C.

Furthermore, it will be seen that, upon a failure of model servomechanism system C, as distinguished from the operating servomechanism systems A and B, the comparators 92 and 94 will cause energization of the relay windings 102 and 104 and the switch arm 112 to open the contact 140 and the switch arm 116 to open the contact 142 so as to open the energizing circuit to the conductor 155 leading to the electromagnetic winding 56A controlling the clutch mechanism 54C so as to effectively disconnect the servomechanism system C.

It can be seen that, upon failure of any of the servo mechanism systems, as hereinbefore described, it would effectively deenergize the filaments of the incandescent lamps 162, 163, and 165, indicating to the operator that one or the other of the servomechanism systems has failed to operate. For example, upon failure of the model servomechanism system C as distinguished from the operating servomechanism systems A and B, the comparators 92 and 94 will cause an energization of the relay windings 102 and 104 and the switch arm 112 to open the contact 140 and the switch arm 116 to open the contact 142 so as to effectively deenergize the filament 160 of the lamp 162, indicating then to the operator that the model servo mechanism system is at fault as failing to conform to the follow-up position signal applied by the synchros 80A and 80B of the servomechanism systems A and B.

In the aforenoted arrangement, it will be further seen that the flexible link preloaded override spring devices 62A and 62B will act as a rigid link since both servomechanism systems A and B will drive the load control linkage 64. However, in the event one of the servo mechanism systems A, B, or C for example, servomechanism system A goes hard over, then by virtue of the flexible link preloaded override spring device 62B and the feedback action thereof, the other servomechanism system in the example given, servomechanism system B, will restrain and drive in opposition to the servomechanism system A. This will result in the preloaded override spring devices 62A and 62B flexing in disagreement and the angular disagreement in adjusted positions of the shafts 60A and 60B being reflected back through the position follow-up synchros 80A and 80B so as to cause the comparators 90 and 92 to cause energization of the relay windings 100 and 102 in response to such difference to cause the deenergization of the electromagnetic winding 56A to deenergize the electromagnetic winding 54A to release clutch 58A and disconnect the servo mechanism system A from the output shaft 63A.

Now, in the event of a passive failure of one servomechanism system, for example, the servomechanism system A, the second operating servomechanism system B will tend to drag the failed servomechanism system A along with it. However, because of the flexible link preloaded override spring device 62A, such device will deflect and cause a disconnection of the faulty servomechanism system due to the action of the position follow-up synchros 80A, 80B, and 80C, as heretofore explained. Moreover, in the latter action, the preloaded drag mechanism 50A is arranged so as to exceed the preload of the flexible link preloaded override spring device 62A so as to cause the position follow-up servomechanism 80A to generate a follow-up error and prompt detection of such passive failure. Moreover, the drag mechanism 50A, as shown in FIGURE 1, is located between the servomotor 36A and the clutch mechanism 54A so that with the disengagement of the malfunctioning servomechanism system, in the case given servomechanism system A, the drag load applied by the mechanism 50A is removed from the main control system.

*Power output system*

Referring to the drawing of FIGURE 2, the load control linkage 64 includes the bell-crank levers 65A and 65B operated by rudder power control actuators or servomechanisms 74A and 74B, as more fully described in the aforementioned copending U.S. application Ser. No. 414,086. It should be noted that the servomechanism 74A, designated with the letter S in the U.S. application Ser. No. 414,086, includes the two-phase servomotor 36A, the gear train 42A, the drag mechanism 50A, and the clutch mechanism 54A having the shaft 60A which is designated as numeral 40 in the U.S. application Ser. No. 414,086. Here again, it should be noted that the servomechanism 74A may also include the summation resistors 26A and the servoamplifier 30A. In addition, it should be noted that the flexible link spring device 62A includes the output shaft 63A which is designated as numeral 21 in the U.S. application Ser. No. 414,086. The bell-crank lever 65A includes arms 200A and 202A extending at right angles, one to the other, with the arm 200A connected by a link 204A to a piston 206 connected at the opposite side by a link 204B to a corresponding arm 200B of the bell-crank lever 65B. The piston 206 is slidably mounted in a cylinder 208 and is normally biased by preloaded springs 210A and 210B bearing on opposite sides of the piston 206 to the neutral position shown.

The other arm 202A of the bell-crank lever 65A is connected by a link 212A to a point 214A intermediate the opposite ends of a second bell-crank lever 216A. The bell-crank lever 216A has two arms 218A and 220A extending at an obtuse angle, one to the other, with the arm 218A connected by a push rod 222A for operatively positioning a servomotor control valve 225, as will be explained hereinafter.

The other arm 220A of the bell-crank lever 216A is connected by a link 227A to an arm portion 229A of a third bell-crank lever 231A pivotally mounted at 232A on a bracket 235A projecting from a base plate, as shown in FIGURE 2.

The bell-crank lever 231A has an arm portion 237A extending at an obtuse angle to the arm portion 229A and connected by a link 241A to an arm 243A of a fourth bell-crank lever 245A pivotally mounted by a pin 247 on a rudder control bar 250 at a point concentric to a shaft 253 for pivotally supporting the rudder bar 250 and a rudder surface 255 formed integral with the rudder bar 250.

The bell-crank lever 245A has a second arm 255A extending at an obtuse angle to the arm 243A. The arm 255A is connected by a link 257A to an arm 260A of a bell-crank lever 262A pivotally mounted by a pin 264A at one end of the rudder bar 250. The bell-crank lever 262A has a second arm 266A extending at right angles to the arm 260A and connected by a cable 268A to one end of a pilot's control bar 270 pivotally mounted by a shaft 272. Spring elements 273A and 274A are connected to the arm 266A of the bell-crank lever 262A so as to normally maintain the bell-crank lever 262A in the neutral position shown in FIGURE 2.

Further, operatively connected to the rudder bar 250 by a rod 280A is a piston ram 282A slideably mounted in a piston cylinder 285A. The position of the piston 282A and the cylinder 285A is operatively controlled by the servovalve 225, as hereinafter explained.

The bell-crank lever 65B operated by the rudder power control actuator or servomechanism 74B is operatively connected to the load control linkage 64 by corresponding parts to those heretofore described with reference to the bell-crank lever 65A controlled by the actuator or servomechanism 74A and herein indicated by corresponding numerals with the suffix B. In view of the previous description with reference to the corresponding parts with the suffix A, no further description of the corresponding parts with the suffix B is deemed necessary.

The pilot's control bar 270 connected through the cables 268A and 268B to the bell-crank levers 262A and 262B may effect, through the heretofore described operating linkage and bell-crank levers 245A-245B and 231A-231B and bell-crank levers 216A-216B an operation of the slideable valve mechanism 225 to one side or the other of the neutral position, dependent upon the actuation of the pilot's control bar 270 about the pivot shaft 272 so as to cause operation in the piston rams 282A and 282B, one in an inward sense and the other in an outward sense, so as to effect corresponding pivotal movement of the rudder bar 250 about the shaft 253, which, in turn, cause a follow-up adjustment of the bell-crank levers 262A and 262B to cause the bell-crank levers 216A and 216B to readjust the servovalve 225 to a neutral position in the position follow-up action.

In an alternate operation, the servomechanisms 74A and 74B may actuate the controlling bell-crank levers 65A and 65B in opposite senses so as to effect, through the bell-crank levers 216A and 216B, a corresponding adjustment of the control valve 225 to effect the desired controlling action through the piston rams 282A and 282B controlled by the servovalve 225, as heretofore explained. The resulting pivotal operation of the rudder control bar 250 about the shaft 253 effects a position follow-up action on the servovalve 225 through the linkage mechanism heretofore described. It should be noted that the servovalve 225 is provided with pressure ports P to receive pressure from a pressure supply source (not shown) and is also provided with discharge ports D through which the pressure in the valve 225 may be dissipated.

It should be also noted that in the event of a complete failure of one servomechanism system, that is, if one servomechanism system, for example servomechanism system A, goes hard over, it will result in its follow-up shaft 75A remaining substantially fixed. Since its follow-up shaft 75A is locked by the inoperative servomechanism system A, in order for the remaining operative servomechanism system B to work, it will tend to override the preload of the inoperative override spring device 62A to thereby permit the actuation of the rudder 255 through the operative load control linkage 64B through its piston ram 282B controlled by the servovalve 225.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. A fail operative apparatus for a flight control system, comprising, two servomechanisms coupled to the same load for actuating the flight control system, each of said servomechanisms including a servomotor having a servoshaft, a clutch for connecting said servoshaft to the flight control system, and a drag device between said servoshaft and said clutch, and each of said clutches being operable to open for removing the effect of the drag device of the inoperative servomechanism.

2. The structure of claim 1 further comprising means for detecting the effect of the drag devices and for sensing that one of said drag devices is lagging due to the inoperativeness of a servomechanism with which said drag device is connected, and means for automatically releasing the effect of the drag device of said inoperative servomechanism for reducing the load necessary to operate said flight control system.

3. A triplicate servomechanism for a control system of a vehicle, two of said servomechanisms comprising a servomotor, a gear train operable by said servomotor, said gear train having an output shaft, a drag mechanism connected to the output shaft of said gear train, a flexible link preloaded override spring device, a clutch mechanism interposed between the output shaft of said gear train and said preloaded override spring device, each of said preloaded override spring devices connected to the control system of the vehicle, the third servomechanism operable as a monitoring device including a servomotor and a gear train, having an output shaft, a clutch connecting the output shaft of said gear train, and an electronic system connecting said servomechanisms operable for disengaging the clutches of said servomechanisms such that when one of said servomechanisms is inoperative, the electronic system disconnects its clutch for relieving the operative servomechanism and for monitoring through said third servomechanism.

4. The structure of claim 3 wherein said electronic system comprises an intermediate amplitude selective gate connecting each of said servomechanisms, filter networks interconnecting said intermediate amplitude selective gates, a sensor connecting each of said filter networks, a position follow-up means connecting said servomechanisms and a comparator means interconnecting said position follow-up means and said intermediate amplitude selection gates, said intermediate amplitude selection gates operable for selecting the inoperative servomechanism and for relieving the clutch of the inoperative servomechanism.

5. The structure of claim 4 further comprising lamp means connecting said comparator means for indicating any inoperativeness in the servomechanisms.

6. A fail operative apparatus for a control system arranged to operate a control of a vehicle, comprising two servomechanisms, flexible link means having a predetermined preload interposed between the servomechanisms and the control of the vehicle so that under normal operation, both servomechanisms operate the control and, upon one servomechanism becoming inoperative, the other servomechanism operates the control and the inoperative servomechanism is disconnected from the control when the preload of the flexible link is exceeded, each of said servomechanisms including a drag mechanism and a clutch interposed between the drag mechanism and the vehicle control, and means for disengaging the clutch of the inoperative servomechanism to render the drag mechanism inoperative on the operative servo, when the preload of the flexible link is exceeded.

7. A fail operative apparatus for a control system arranged to operate a control of a vehicle, comprising two servomechanisms, flexible link means having a predetermined preload interposed between the servomechanisms and the control of the vehicle so that under normal operation, both servomechanisms operate the control and, upon one servomechanism becoming inoperative, the other servomechanism operates the control and the inoperative servo mechanism is disconnected from the control when the preload of the flexible link is exceeded, each of said servomechanisms including a drag mechanism and a clutch interposed between the drag mechanism and the vehicle control, and means for disengaging the clutch of the inoperative servomechanism to render the drag mechanism inoperative on the operative servo, when the preload of the flexible link is exceeded, and a third servomechanism operable for detecting failures of the inoperative servomechanism when said two servomechanisms are coupled to the vehicle control.

8. A fail operative apparatus for a control system arranged to operate a control of a vehicle, comprising a plurality of servomechanisms normally coupled to said control, means for synchronizing said plurality of servomechanisms, separate means for connecting each of said servomechanisms to the control, each of said separate connecting means including a releasable clutch and a flexible link preloaded override spring device, comparator means operable by the servomechanisms for opening the releasable clutch of the connecting means for each servomechanism to disconnect one of the servomechanisms from the control when said one servomechanism has failed to operate, and said flexible link preloaded override spring device releasing one of the servomechanisms upon the other of the servomechanisms exceeding the preload of the override spring device of the connecting means of said one servomechanism.

9. A fail operative apparatus for a control system arranged to operate a control of a vehicle, comprising a plurality of servomechanisms controlled by said control system, means for providing a predetermined preload interposed between each of the servomechanisms and the control of the vehicle so that under normal operation, the servomechanisms operate the control, comparator means operated by the servomechanisms, means to disconnect said servomechanisms from said control, said disconnect means being operated by said comparator means upon one of said servomechanisms becoming inoperative, the other of said servomechanisms being effective to operate the control while the inoperative servomechanism is disconnected from the control by the operation of the disconnect means so that the predetermined preload interposed by the aforesaid means between the inoperative servomechanism and the control may be effectively removed.

10. The combination defined by claim 9 including a plurality of intermediate amplitude selective gates interconnecting said servomechanisms in said control system for effecting stability of control of the servomechanisms by said control system.

References Cited

UNITED STATES PATENTS

| | | | |
|---|---|---|---|
| 3,054,039 | 9/1962 | Meredith | 318—489 |
| 3,145,330 | 8/1964 | Hecht | 318—19 |
| 3,190,586 | 6/1965 | Righton | 318—28 XR |
| 3,219,295 | 11/1965 | Hastings | 318—489 |

BENJAMIN DOBECK, *Primary Examiner.*